US009362655B1

(12) United States Patent
Rauckman et al.

(10) Patent No.: US 9,362,655 B1
(45) Date of Patent: Jun. 7, 2016

(54) SAFETY COVER AND IDENTIFIER FOR ELECTRIC TERMINAL BLOCK

(71) Applicants: James B. Rauckman, Swansea, IL (US); David W. McGuire, Jerseyville, IL (US)

(72) Inventors: James B. Rauckman, Swansea, IL (US); David W. McGuire, Jerseyville, IL (US)

(73) Assignee: Gato Assets, LLC, Belleville, IL (US)

( * ) Notice: Subject to any disclaimer, the term of this patent is extended or adjusted under 35 U.S.C. 154(b) by 3 days.

(21) Appl. No.: 14/329,257

(22) Filed: Jul. 11, 2014

Related U.S. Application Data

(63) Continuation of application No. 14/017,813, filed on Sep. 4, 2013, now Pat. No. 9,225,155.

(51) Int. Cl.
*H01R 27/00* (2006.01)
*H02G 3/14* (2006.01)
*H01R 13/447* (2006.01)
*H01R 13/46* (2006.01)
*H01R 9/24* (2006.01)

(52) U.S. Cl.
CPC ............ *H01R 13/447* (2013.01); *H01R 9/2475* (2013.01); *H01R 13/465* (2013.01)

(58) Field of Classification Search
CPC ..... A44B 15/005; H05K 5/0278; H01R 13/60
USPC ............ 439/489, 490, 135, 147, 133; 24/327; 200/43.19
See application file for complete search history.

(56) References Cited

U.S. PATENT DOCUMENTS 2,727,965 A * 12/1955 Toth ..................... H01H 9/0264 200/304
3,247,480 A * 4/1966 Orzechowski ....... H01R 9/2475 439/491
3,404,435 A * 10/1968 Freundlich ............. B42F 1/006 24/67.9
3,753,216 A * 8/1973 Johnson ................... H01R 9/26 439/491
4,133,598 A * 1/1979 Kuntzsch ................. H01R 9/24 439/712
4,197,945 A * 4/1980 Sherwood ............ H01R 13/447 174/138 F
4,277,863 A * 7/1981 Faneuf ................... A44B 99/00 224/247
4,506,416 A * 3/1985 Ohminato ................. B42F 1/10 24/489
4,714,434 A * 12/1987 Norden ................ H01R 9/2475 439/488
5,026,295 A * 6/1991 Fong .................. H01R 13/5213 439/135
5,173,057 A * 12/1992 Bunch ................ H01R 13/5202 439/149
5,322,980 A * 6/1994 Benda ................ H01H 71/1018 200/43.11
5,613,864 A * 3/1997 Northey ............... H01R 43/205 439/149
5,613,884 A * 3/1997 Krivec ...................... B25B 7/18 24/518
5,732,921 A * 3/1998 Lemire ................. A47F 5/0006 24/515
5,802,677 A * 9/1998 Dorman ............. B65D 33/1675 24/30.5 P
6,580,041 B1 * 6/2003 Ransopher ............. H01H 9/286 200/43.11
8,430,681 B2 * 4/2013 Wang ................... A61B 5/0416 439/217
9,059,533 B2 * 6/2015 Bogart ..................... H01H 9/00
2012/0295472 A1 * 11/2012 McSweyn .............. H01R 13/60 439/501
2013/0078833 A1 * 3/2013 Ranta ..................... H01R 13/04 439/160

* cited by examiner

*Primary Examiner* — Briggitte R Hammond
(74) *Attorney, Agent, or Firm* — Senniger Powers LLP

(57) ABSTRACT

A safety cover and identifier to cover wire terminals in an electric terminal block. The cover/identifier comprises a body comprising dielectric material having a first leg and an opposed, spaced apart second leg The two legs are joined adjacent their midpoints by an integral, resilient spring element. The opposed proximal ends of the legs each have a terminal covering surface and define serrated jaws. The jaws are opened by compression of the distal ends of the legs. The jaws are attached to the electrical terminal block to cover wire connections and each of the proximal ends covers one of a functional pair of wire connectors. The resilient spring element biases the jaws toward each other to secure the cover in place. The device can include stops or a stop gap in the spring to delimit opening of the jaws. The cover/identifier includes indicia to identify aspects of the wires attached to the cover wire connectors.

13 Claims, 11 Drawing Sheets

SAFETY COVER AND IDENTIFIER FOR ELECTRIC TERMINAL BLOCK

CROSS REFERENCE TO RELATED APPLICATIONS

This application is a continuation-in-part of application Ser. No. 14/017,813 filed Sep. 4, 2013, which is incorporated herein by reference.

BACKGROUND

The present disclosure relates to safety equipment for men working on electrical power distribution equipment such as terminal blocks in a substation or the like and more particularly to a device for identifying and covering terminal connections in a terminal block to prevent inadvertent disconnection of electrical connections and subsequent power failures.

Terminal blocks (also called terminal strips, connection terminals or screw terminals) are known to the art and provide a convenient means of connecting individual electrical wires without a splice or physically joining the ends. They are usually used to connect wiring among various items of equipment within an enclosure or to make connections among individually enclosed items. Terminal blocks are readily available for a wide range of wire sizes and terminal quantity. They are widely used in electric substations to connect wires from various sources including control and monitoring equipment.

Terminal Blocks generally are modular, insulated sections that fasten two or more wires together allow wiring to be centralized and make it easier to manage complicated control circuits. When modifications in the circuit must be carried out, terminal blocks can be easily added or removed from a rail or other mounting without interfering with other wire terminations. In addition to minimizing complexity of control wiring, the plastic frames of terminal blocks also protect against shorts and subsequently provide increased safety to installers and service crews.

One disadvantage is that a substation, for example, can house thousands of connecting wires. The connecting wires are not well marked. Furthermore, the terminals are generally not very well protected from contact with persons or foreign conducting materials. In any event, if a technician erroneously disconnects the wrong wires from a terminal block, it can cause power failure, sometimes a catastrophic cascade of power failure in an interconnected power grid.

It would be advantageous, therefore, to have an apparatus for connecting to a terminal block that both covers those wire connections to prevent inadvertent disconnection of wires and resultant power failure, and indicates which connections should be avoided or worked on.

SUMMARY OF THE DISCLOSURE

A safety cover and identifier is disclosed to cover wire terminals and wire connections in an electric terminal block to prevent inadvertent disconnection of wires and indicate which connections should be avoided or worked on. In one aspect, the cover/identifier comprises a body having a first substantially flat leg and an opposed, spaced apart mirror image second leg The two legs are joined adjacent their midpoints by an integral, resilient spring element. The opposed proximal ends of the legs each define serrated jaws. The jaws are opened by compression of the distal ends of the legs. The jaws are attached to the electrical terminal block to cover wire connections and each of the proximal ends covers one of a functional pair of wire connectors. The resilient spring element biases the jaws toward each other to secure the cover in place. The cover/identifier includes structure to attach indicia to identify aspects of the wires attached to the cover wire connectors.

In another aspect, the cover/identifier includes stop elements to prevent the jaws from opening too wide thereby preventing warping and material fatigue of the spring element.

In another aspect, the proximal ends of each leg define an opening for a connector to connect two or more cover and identifiers together side-by-side.

In another aspect, the distal ends of each leg each define an opening for the attachment of a connector or an identifier.

In another aspect, the cover/identifier is attached between dividers on the same side of a bank of wire terminals.

In another aspect, the cover identifier is positioned on a divider between the two wire terminals on the same side of a bank of wire terminals.

In another aspect the safety cover and identifier is molded from a dielectric material.

In another aspect the safety cover and identifier is provided in predetermined color indicia.

DETAILED DESCRIPTION

The safety cover/identifier disclosed herein is designed to be use with a conventional terminal block. By way of example, it is designed to be used with terminal blocks employed in the electric utility industry. One example is electric terminal blocks employed in electric substations and the like. However, it can be used in any environment and is not limited to the electric utility industry.

Figure 1:
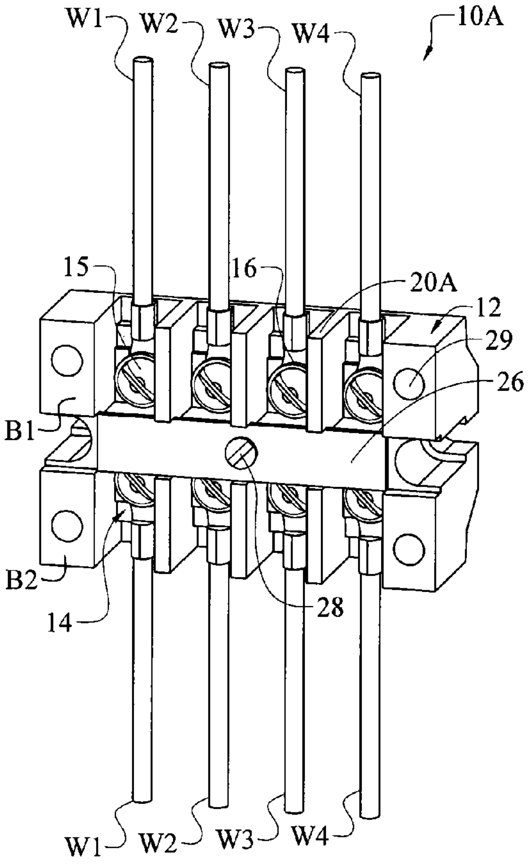
FIG. 1 is a front perspective view of one embodiment of an electric terminal block with connected wires.
Figure 2:
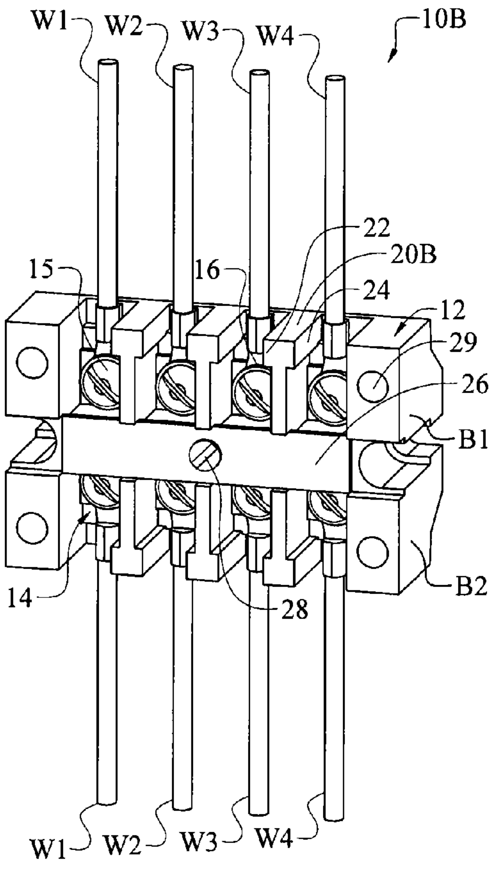
FIG. 2 is a front perspective view of another embodiment of an electric terminal block with connected wires.

Representative examples of terminal blocks are shown in FIGS. 1 and 2 and indicated generally by reference number 10A and 10B, respectively. Terminal blocks can also be referred to terminal strips, connection terminals or screw terminals. Blocks 10A and 10B each include an insulating body 12 that houses the current carrying elements. Body 12 generally is constructed from a dielectric thermoplastic or thermoset material or ceramic or the like.

The current carrying parts consist of wire terminals 14, including a device screw 15 or other means for securing one end of a wire to the terminal. As shown, the terminal block includes two banks B1 and B2 of opposed wire terminals. Each pair of opposed wire terminals is electrically connected by a current bar (not seen). The current bar, at the core of the insulating body 12, is constructed from copper or brass. The screw 15 fastens a wire to a wire terminal 14 in the terminal blockand creates a dependable electric connection between the wire and the current carrying bar. The dimensions of current carrying parts vary in regard to the amperage/wire size and the construction of the block itself. Depending upon terminal block layout, wires can be secured in position using screws 15 a combination of screws and pressure plates or other appropriate elements.

It will be noted that the terminal block includes a plurality of pairs of wire terminals 14. In the embodiment shown, one wire terminal 14 accommodates a wire, e.g. W1 carrying electric current toward the block and one terminal accommodates a wire W1 carrying electric current away from the block. For purposes of description such a pair of wire terminals may be referred to as a functional pair of wire terminals. Hence, the terminal block serves to connect two sections of a single functional wire though a functional pair of wire terminals joined by a current bar. It will be appreciated that if one of the wires is disconnected from a wire terminal, current flow through the block will stop, with potential concomitant consequences.

As mentioned above, terminal block 10A or 10B serves to connect two sections of a plurality of pairs of wires W1, W2; W3, W4 and so forth. In the illustrated embodiments of the terminal blocks, the ends of the wires terminate in a metal connector 16 such as a metal loop which is attached to the wire terminal 14 by screws 15 so as to be in electrical contact. The number of pairs of wires can vary according to the size of the terminal block, the number of pairs of wire terminals, and the environment and application of use for the terminal block. Suffice to say, that a terminal block or series of terminal blocks in any given environment can connect hundreds or even thousands of pairs of wires.

Each wire terminal 14 is separated laterally from the adjacent wire terminal by a divider or wall 20A in block 10A and wall 20B in block 10B. These dividers are constructed from a dielectric material and isolate adjacent wire terminals from each other. As shown, walls 20A in block 10A are substantially flat. On the other hand, walls 20B in block 10B have a substantially T-shaped cross-section defined by shoulders 22 and 24.

There is a center, transverse divider 26 extending the middle length of the block separating the opposed banks B1 and B2 of wire terminals. Divider 26 can be integral or can be a flat plate fastened to the block by a screw 28 or other means. Divider 26 delineates one side of the terminal block, with its array of wire terminals, from the other side of the terminal block and its complementary array or wire terminals.

Each representative terminal block includes some means for mounting the terminal block in its useful environment. For example holes 29 in the corners of body 12 can accept screws or nut and bolt combinations or other fasteners to secure the terminal block to a terminal block channel or directly to a structure, or the like. The mounting means is incidental to the disclosure.

Figure 3:
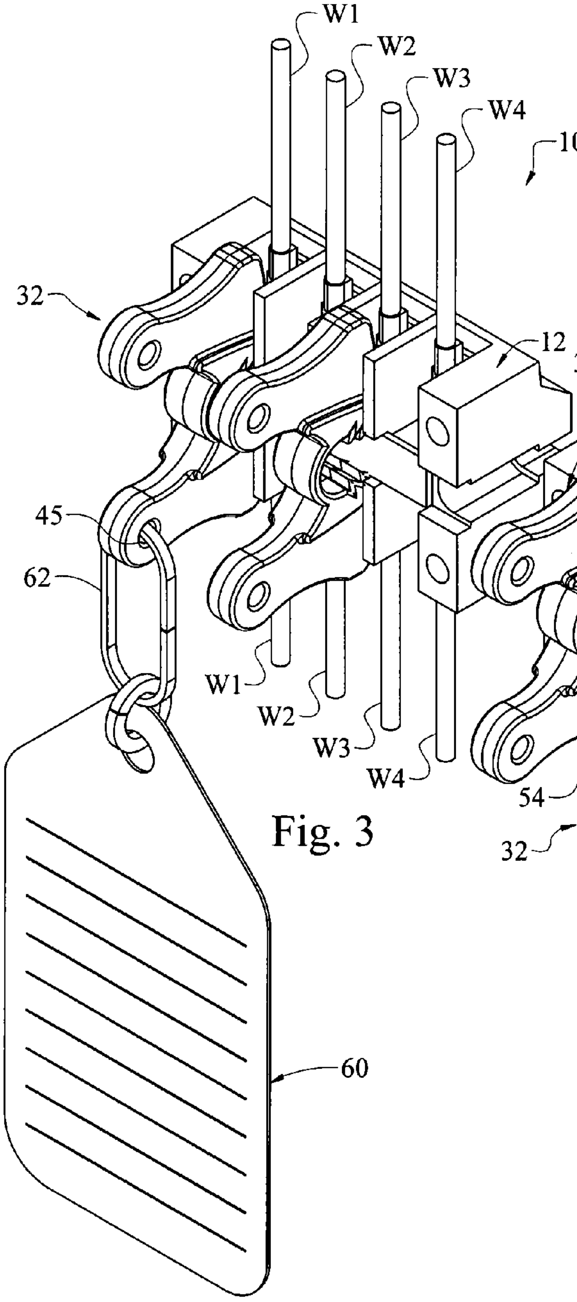
FIG. 3 is a front perspective view of a pair of safety cover/identifiers attached to the terminal block of FIG. 1.
Figure 4:
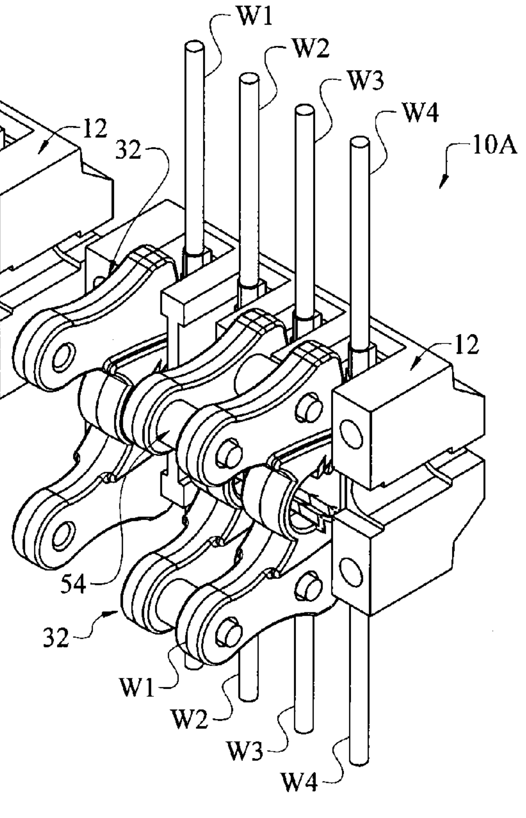
FIG. 4 is a front perspective view of an array of safety covers/identifiers attached to the terminal block of FIG. 2.

As can be seen in FIGS. 1 and 2, and as explained above, the ends of wires W1-W4 with connectors 16 are attached to wire terminals 14 in terminal block 10A and 10B by screws 15. However, the ends of the wires and the wire terminals and screws are exposed. Moreover, an electric substation, for example, may have thousands of wires connected through hundreds of terminal blocks. If a technician is required to work on a terminal block it is possible that he could disconnect the wrong wires, resulting in a catastrophic, cascading power outage. FIGS. 3 and 4 illustrate one aspect of a cover/identifier employed to cover the ends of the wires and the connecting screws 16 and identify the source or other aspects of the wires themselves.

One aspect of the cover/identifier, referred to by reference number 32, is shown in greater detail in FIGS. 5-8. It will be appreciated that cover/identifier 32 is referred to as a cover/identifier for convenience, since it has safety cover aspects and identification aspects. In any event, the cover/identifier may be referred to as a clip, a safety clip, a guard, a clip guard, a connection cover, or any other convenient name without affecting the scope of the instant disclosure. Hereinafter, the disclosed cover/identifier may also be referred to as the "device" for purposes of simplicity and clarity. The safety cover aspect of the device will be described immediately below and the identifier aspect of the device will be described hereinafter.

Device 32, as shown, includes a unitary body 33 comprising a first leg 34 and a second opposed leg 36. The respective legs, as shown, are mirror images joined at their approximate midpoints by a resilient spring structure 38. In the illustrated device, spring structure 38 is generally C-shaped; however, any configuration that functions as intended is included within the scope of the disclosure. By way of example only, resilient spring structure 38 could be V-shaped. X-shaped, circular or any other useful configuration.

Device 32 is comprised of a dielectric material, such as a molded plastic material. For example polypropylene or nylon or other plastic materials work well. In a preferred aspect, device 32 is molded as one piece in a cavity mold. However, any method of making the device is acceptable. Moreover, the various elements of device 32 may be constructed separately and assembled.

Figure 5:
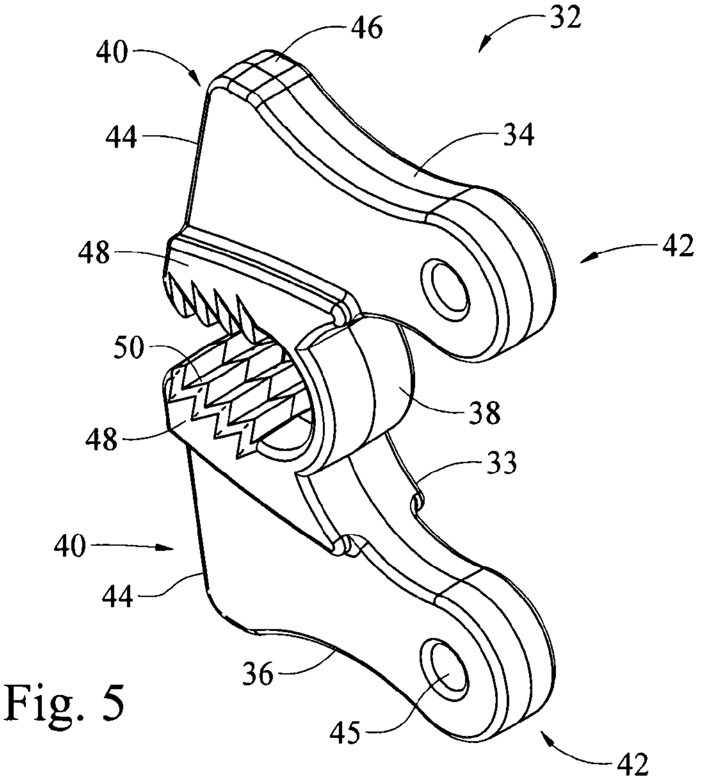
FIG. 5 is a rear perspective view of one aspect of the safety cover/identifier.
Figure 6:
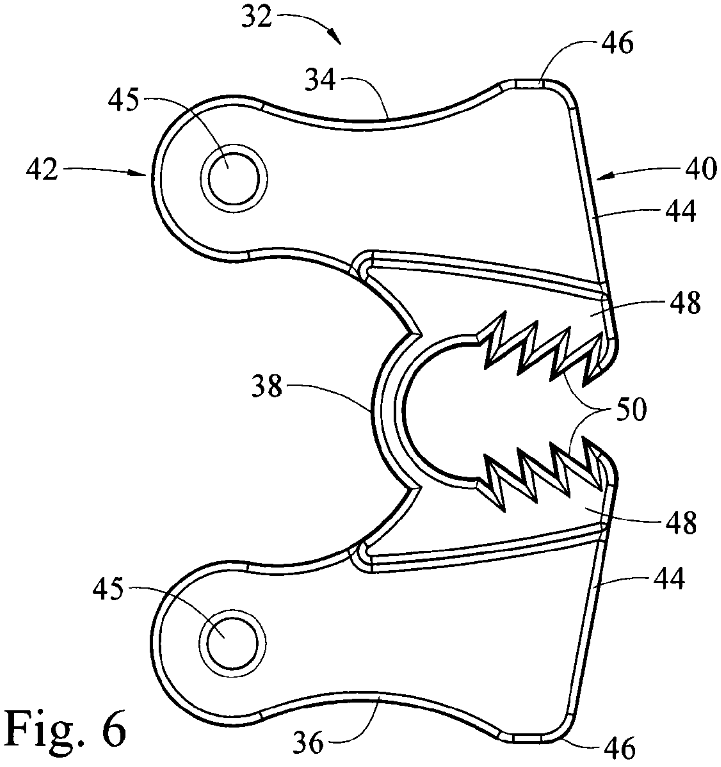
FIG. 6 is a side elevational view of the safety cover/identifier, the opposite side being identical in configuration.

It will be noted that leg 34 and leg 36 are mirror images of each other, although they would not have to be. As best seen in FIGS. 5 and 6, each leg is substantially flat and elongated. Each leg has a proximal end 40 and a distal end 42. The material thickness of each leg is generally uniform along its transverse length. As shown, spring structure 38 is wider than the material thickness of each leg. This relative size relationship provides lateral stability to the device when it is being applied or removed and keeps the legs from twisting at the spring structure. Moreover, it prevents the device from failing at the spring structure due to material fatigue from repeated use.

In any event, in the illustrated aspect the material thickness of the spring structure itself is thinner than the thickness of the legs, such that it is compressible and resilient. The distal ends of the legs can be compressed toward each other but are urged to return toward their original orientation after compressive force is removed by the resilient biasing function of spring structure 38. As seen in FIG. 6, the linear height of proximal end 40 of each leg is greater than that of distal end 42. Proximal end 40 has a substantially flat front face 44. Front faces 44 of the first and second legs each are slightly angled toward the distal ends of the legs and terminate in raised shoulders 46. This angled face allows for more clearance between the face and the wire terminal to accommodate more than one wire on a terminal, for example. Each distal end 42 has an ergonomically pleasing rounded profile. In one aspect, distal ends 42 have openings or holes 45 centrally positioned therein.

Each proximal end 40 has a bottom margin 48 with a lateral width approximately the same as the width of spring structure 38. The wider bottom margin fills the space between the walls 20. Each bottom margin 48 is contiguous with the spring structure and includes forward surface 50, which may be serrated as shown. Bottom margins 48 and forward surfaces 50 of the two legs cooperate to form a pair of opposed jaws. A user can apply minimal compressive force to the distal ends of the legs to overcome the biased torsional force of spring structure 38 to open the jaws and upon release of the compressive force, the spring structure biases the jaws toward each other so as to apply clamping force on the jaws.

As seen in FIGS. 3 and 4, in use, device 32 is attached to the transverse divider 26. Distal ends 40 of the legs are squeezed to open the jaws. The jaws are positioned over divider 26 until each face 44 of the proximal end of each leg abuts or at least covers or blocks the wire terminal 14, the screw 15 and wire connector 16 so to cover the connected ends of the wires on a functional pair of wire terminals in a terminal block. It will be appreciated that the term "cover" as used herein is intended to mean blocking access to the wire terminal and connected wire whether by abutting the wire terminal or providing a barrier or the like. In any event, if serrated, surfaces 50 function as teeth that bite onto divider 26. When compressive force is relieved, spring structure 38 biases the jaws toward each other so that the jaws clamp onto the divider to secure the device in place. The distally angled faces 44 on the proximal ends of the legs provide clearance for the wire terminal and attachment hardware.

As seen in FIG. 4, since the legs are narrower than the spring structure 38, the jaws of the device 32 can easily fit between the lateral walls 20A or 20B, even those walls that have the T-shaped cross-section as shown in FIG. 2. Because the legs are mirror images, the device has no top or bottom which allows for more convenient and rapid installation. A technician does not have to be concerned about proper up or down orientation.

Figure 7:
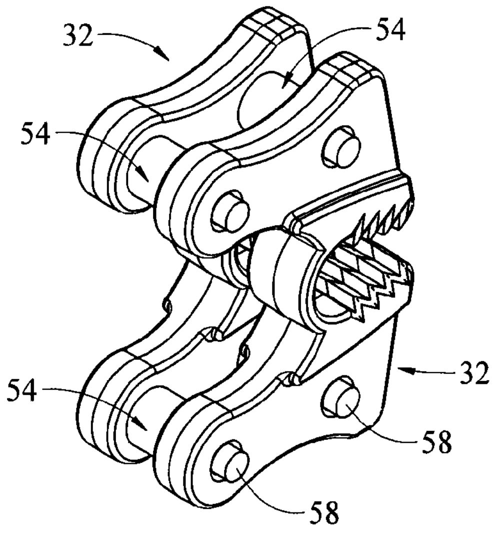
FIG. 7 is a joined pair of the safety cover/identifiers.
Figure 8:
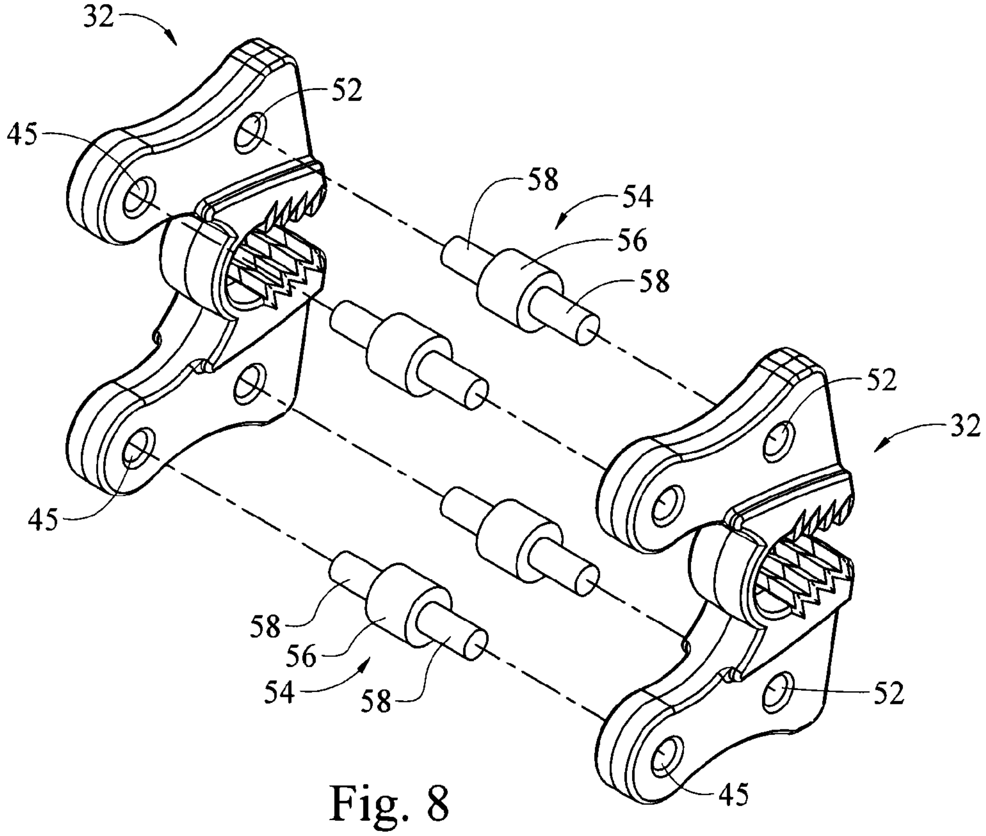
FIG. 8 is an exploded view of the joined pair of safety cover/identifiers of FIG. 7.

FIGS. 4, 7 and 8 illustrate another aspect of device 32. As shown, raised shoulder 46 of each leg include a hole 52. Pairs of adjacent devices 32 can be connected by connector pegs 54. Each peg 54 includes a center section 56 with a concentric extension 58 extending out of each side of the center section. The diameters of extensions 58 are such that the fit snugly into holes 45 and 52 in the legs to secure adjacent devices together with a tight friction fit or glued, for example, to ensure a more permanent connection. It should be understood that peg 54 is constructed from dielectric material and can be constructed in any configuration of peg that corresponds to the opening configurations and functions to secure adjacent devices together is within the scope of the disclosure. For example, the holes and peg extensions could be rectangular or triangular or any configuration.

The indicator aspect of device 32 is two-fold and will now be discussed in greater detail. It will be noted that device 32 can be molded in any desired color. Consequently, the color of each device can function as identifying indicia. The devices can be provided in a plurality of identifying colors. By way of example only, device 32 in red could serve as a warning indicator that the wires or wire connections covered by a red device 32 should not be disconnected under any circumstances. Conversely, wires and wire connections requiring service could be covered with green devices. Red and green are mentioned for purposes of illustration only. The devices could be color coded to indicate the electric equipment energized by any given set of wires connected through a terminal block. Suffice to say, color coding of devices 32 could perform myriad identification functions. Hence, the device can be constructed in a predetermined color that corresponds to predetermined indicia that is readily identifiable by a technician or other individual.

Furthermore, as seen in FIG. 3, an indicator element, in the illustrated embodiment an information or notification tag 60, can be attached to hole 43 in the distal end of device 32 by a plastic loop 62 or other means. Tag 60 can include any useful indicia regarding the wires, the energized devices or so forth. By way of example, tag 60 could include legends such as CRITICAL-TRIP COIL TERMINAL or DO NOT OPERATE. The content of such indicia is limitless. The indicia can be permanently inscribed or can be erasable. Although a tag is shown for convenience and simplicity, any type of indicator element connectable to the device is intended to be included.

Figure 9:
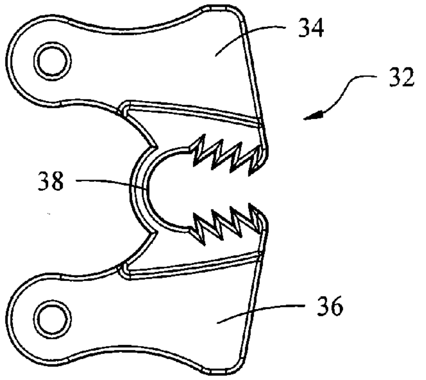
FIG. 9 is a side elevational view of one aspect of the safety cover/identifier.
Figure 10:
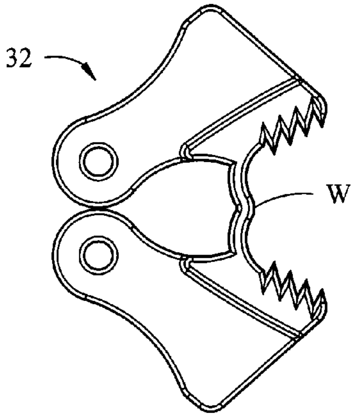
FIG. 10 is a side elevational view of the safety cover/identifier of FIG. 9 with the jaws completely opened.

FIG. 9 illustrates the previously disclosed cover/identifier 32 in a first position or static position. The jaws are spread apart a minimal distance as defined by a normal arc of spring 38. FIG. 10 shows the jaws spread to their maximum width. As can be see, this extreme spreading of the jaws can result in a buckle or warp W of spring 38. Repeated use of the device can result in loss of biasing force of the spring, permanent warping and/or material fatigue of the spring and failure of the device. Also, the technician does not have a feel for how far apart the jaws are spread.

Figure 11:
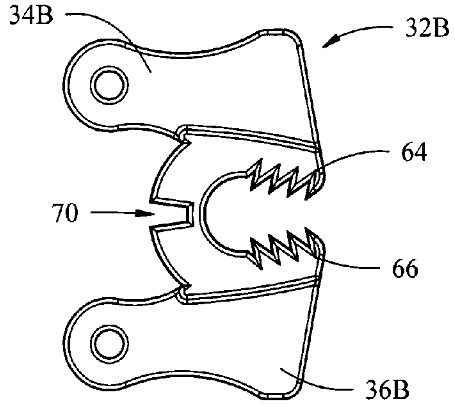
FIG. 11 is a side elevational view of another aspect of the safety cover/identifier.
Figure 12:
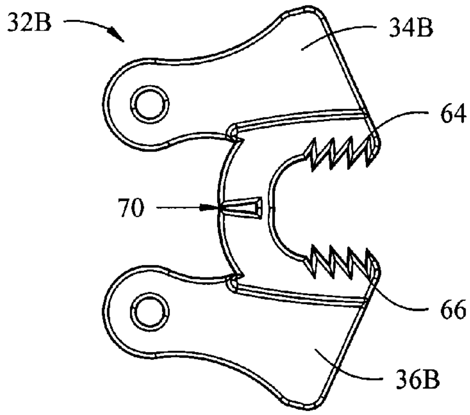
FIG. 12 is a side elevational view of the safety cover/identifier of FIG. 11 with the jaws completely opened.

FIGS. 11 and 12 illustrate another aspect of a cover/identifier indicated generally be reference number 32B. Device 32B includes a first leg 34B and an opposed second leg 36B. The proximal ends of the legs define opposed jaws 64 and 66. The legs are connected by a resilient spring structure 68. As seen, spring structure 68 is substantially C-shaped. However, there is a stop-gap 70 at the midpoint of the spring structure. As seen in FIG. 12, compression of the legs is stopped when stop-gap 70 is closed to prevent the jaws from being spread too far apart. That is, the stop-gap delimits the opening of the jaws. This arrangement helps retard material warping and failure at the spring structure. The stop-gap is configured and sized to allow the jaws to open an optimal width for application onto a terminal block, as previously disclosed. This arrangement allows a technician to easily open the cover/identifier the proper amount.

Figure 13:
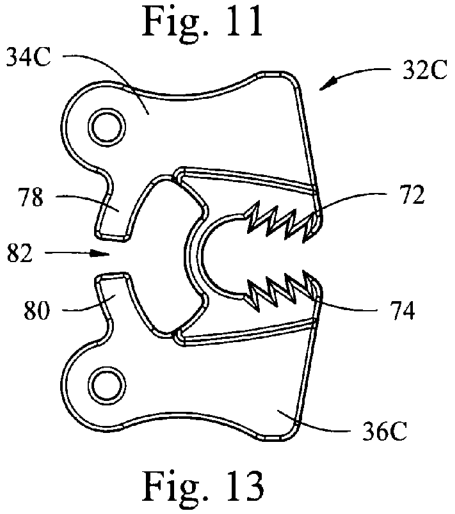
FIG. 13 is a side elevational view of another aspect of the safety cover/identifier.
Figure 14:
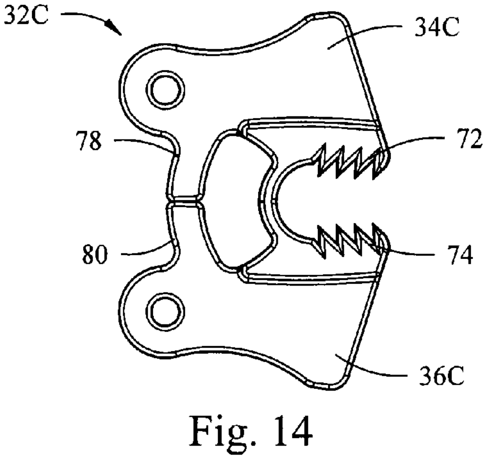
FIG. 14 is a side elevational view of the safety cover/identifier of FIG. 13 with the jaws completely opened.

FIGS. 13 and 14 illustrate another aspect of a cover/identifier indicated generally be reference number 32C. Device 320 includes a first leg 34C and an opposed second leg 36C. The proximal ends of the legs define opposed jaws 72 and 74, which may be serrated. The legs are connected by a resilient spring structure 76. There is a first stop 78 extending from leg 34C and an opposed second stop 80 extending from leg 36C. The respective stops are mirror images. As shown the stops are positioned distally on the leg, however, any position of the stops that functions properly will suffice. As seen in FIG. 13, when device 32C is static there is a gap 82 between the opposed stops. Compression of the legs is stopped when gap 82 is closed and stops 78 and 80 abut each other. This arrangement delimits movement of the jaws and prevents the jaws from being spread too far apart and helps prevent material warping and failure at the spring structure. Gap 82 is configured and sized to allow the jaws to open an optimal width for application of the device onto a terminal block. This arrangement also allows a technician to easily open the jaws of the device the proper width for application.

Figure 15:
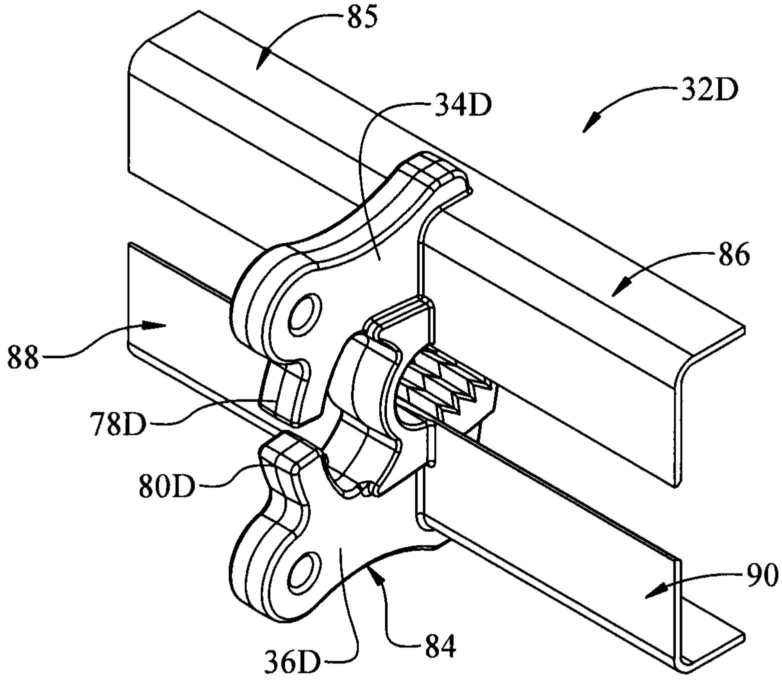
FIG. 15 is a rear perspective view of another aspect of a cover/identifier.
Figure 16:
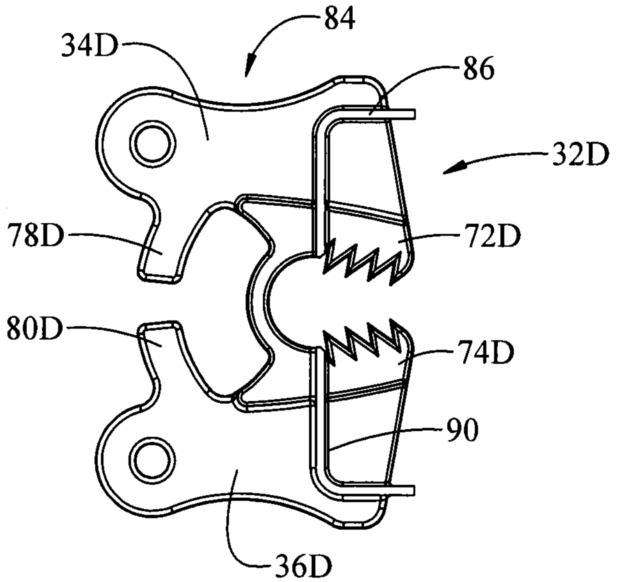
FIG. 16 is a side elevational view thereof.

FIGS. 15 and 16 illustrate another aspect of a cover/identifier indicated generally by reference number 32D. Device 32D includes a central clip 84 configured similarly to cover/identifier 320 shown in FIGS. 13 and 14 and comprises a first leg 34D and an opposed second leg 36D. The proximal ends of the legs define opposed jaws 72D and 74D, which may be serrated. There is a first stop 780 extending from leg 34D and an opposed second stop 80D extending from leg 36D. There are lateral wings 85 and 86 extending from the proximal end of leg 34D. As seen in FIG. 16, wings 85 and 86 have a substantially L-shaped cross sectional configuration. There are lateral wings 88 and 90 extending from the proximal end of leg 360. Wings 88 and 90 also have a substantially L-shaped cross-sectional configuration.

Figure 19:
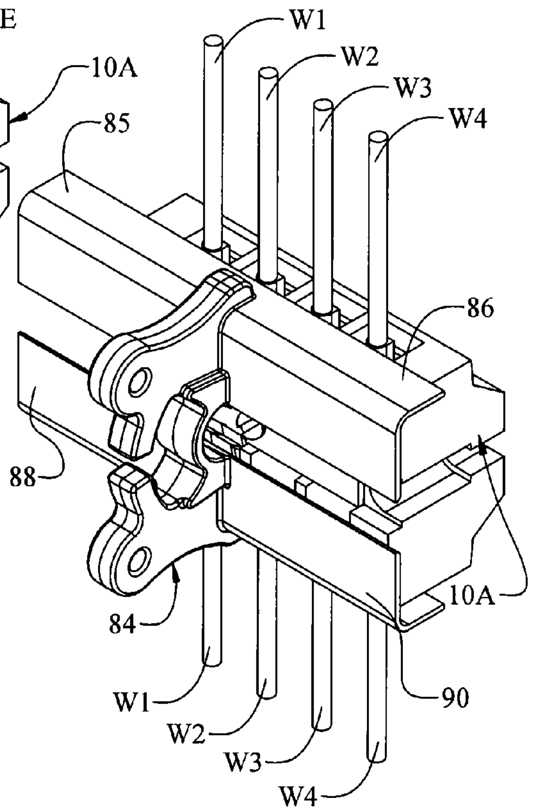
FIG. 19 is a perspective view of the cover identifier of FIG. 15 attached to a terminal block.

FIG. 19 shows the cover/identifier of FIGS. 15 and 16 attached to a terminal block 10A. Jaws 72D and 74D (FIG. 16) are opened such that they can be clipped on or secured to the center, transverse divider 26 (FIG. 1). Once in place lateral wings 85 and 86 cover one bank of wire terminals 14 and lateral wings 88 and 90 cover the opposite bank of wire terminals. The L-shaped configuration of the wings allows them to more completely cover or partially wrap around the wire terminals. However, it will be appreciated that the wings could be substantially flat instead of L-shaped and still extend over the wire terminals.

Figure 17:
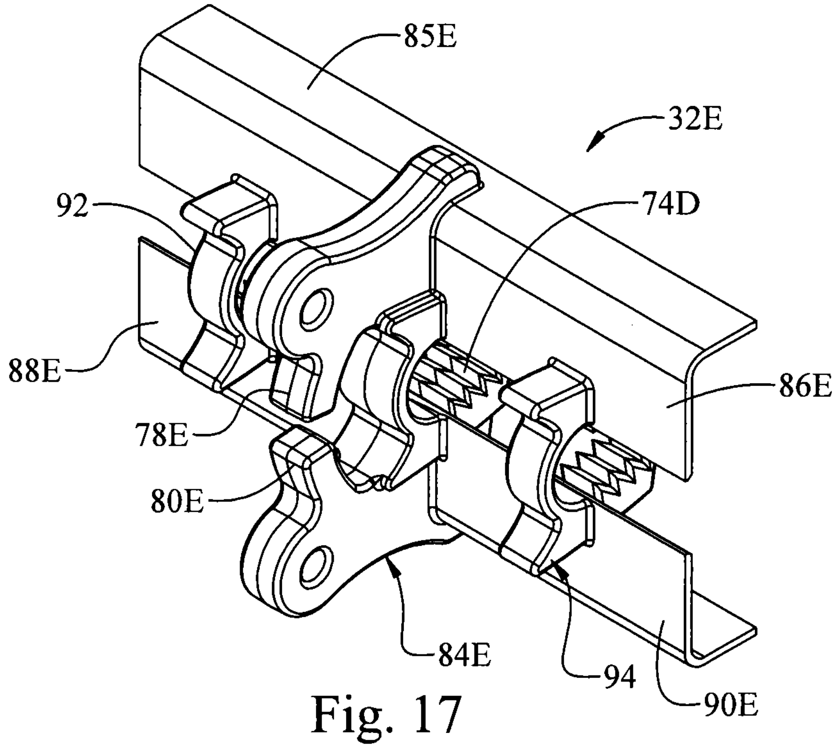
FIG. 17 is a rear perspective view of another aspect of a cover/identifier.
Figure 18:
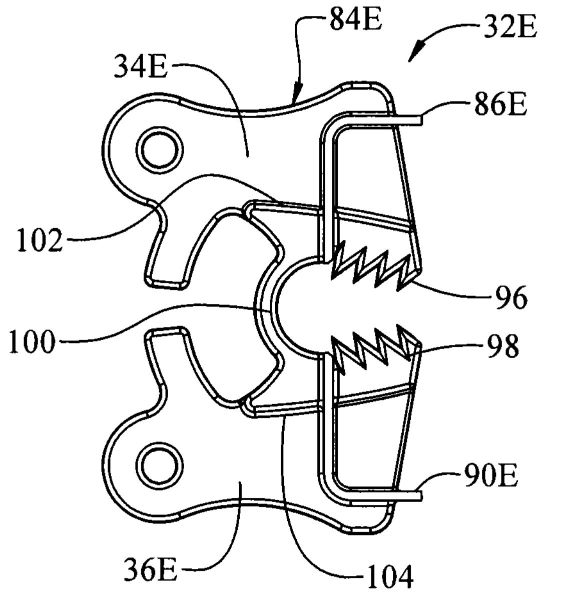
FIG. 18 is a side elevational view thereof.

FIGS. 17 and 18 illustrate another aspect of a cover/identifier indicated generally by reference number 32E. Device 32E is constructed similarly to device 32D, described immediately above, and includes a central clip 84E configured similarly to device 320 shown in FIGS. 13 and 14. Device 32E comprises a first leg 34E and an opposed second leg 36E. The proximal ends of the legs define opposed jaws 72D and 74D (FIG. 16), which may be serrated. There is a first stop 78E extending from leg 34E and an opposed second stop 80E extending from leg 36E. There are lateral wings 85E and 86E extending from the proximal end of leg 34E. There lateral wings 88E and 90E extending from the proximal end of leg 36E. The illustrated wings have a substantially L-shaped cross sectional configuration.

Figure 20:
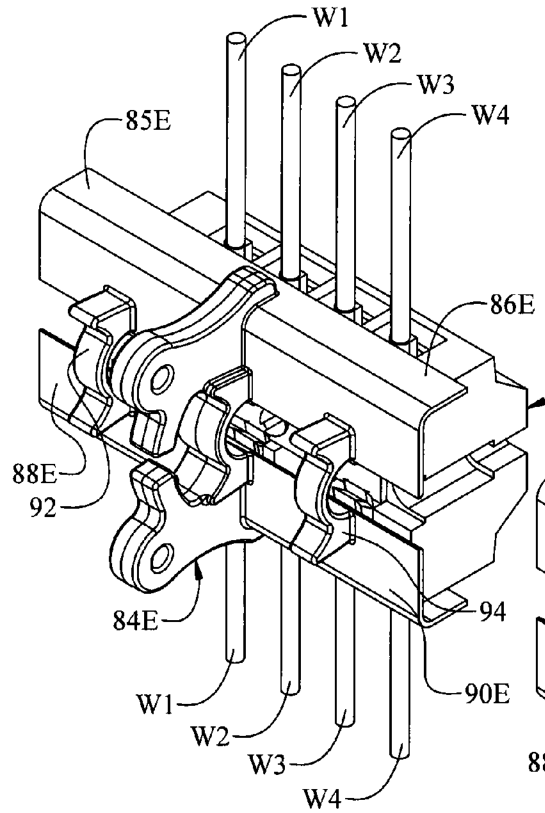
FIG. 20 is a perspective view of the cover/identifier of FIG. 17 attached to a terminal block.

Device 32E further comprises a first stabilizer clip 92 affixed between opposed lateral wings 85E and 88E and a second stabilizer clip 94 affixed between opposed lateral wings 86E and 90E. As shown, the stabilizer clips each include opposed jaws 96, 98, which may be serrated, a resilient spring structure 100 between the jaws, and opposed compression pads 102 and 104. As seen in FIG. 20, device 32E is attached to a terminal block by opening jaws 72D and 74D (FIG. 16) and attaching the jaws to divider 26 (FIG. 1). Wings 85E, 86E extend laterally to cover one bank of wire terminals. Wings 88E and 90E extend laterally to cover the other bank of wire terminals. However, device 32E is further secured in place by clipping stabilizer clips 92 and 94 to divider 26.

Figure 21:
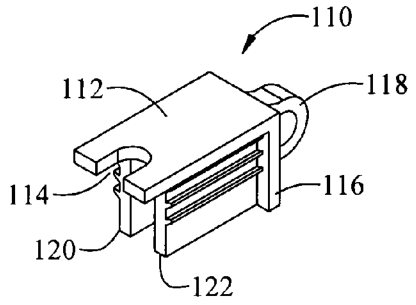
FIG. 21 is a front perspective view of another aspect of a cover/identifier.
Figure 22:
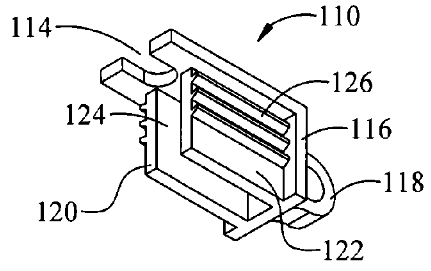
FIG. 22 is a front bottom perspective view thereof.

FIGS. 21-26 illustrate several additional aspects of a cover/identifier. One embodiment, indicated by number 110 in FIGS. 21-23 includes a substantially flat top wall 112 with a cut-out 114 at its proximal end and a depending rear wall 116 at its distal end. There is a loop 118 on the rear wall. Loop 118 functions as a handle during installation and removal and also provides a structure for the attachment of information or notification tag 60, as previously described. Device 110 also includes a pair of spaced apart walls 120 and 122 disposed perpendicular to rear wall 116. Walls 120 and 122 are perpendicular to, and depend from, top wall 112 and extend longitudinally from the rear wall to approximately adjacent cut-out 114. Walls 120 and 122 define an interior channel 124 between the walls. Channel 124 is sufficiently wide to accommodate the head of screw 16 (FIG. 1) or other terminal hardware. In the embodiments of FIGS. 21 and 22, the exterior surfaces of walls 120 and 122 include a plurality of longitudinal flexible fins 126 that extend the length of the wall. The embodiment of FIG. 23 includes a plurality of flexible fins 128 that are arranged perpendicular to top wall 112.

Figure 24:
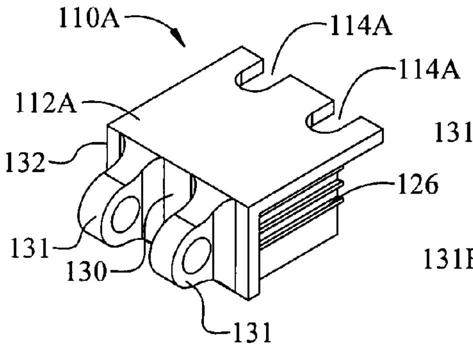
FIG. 24 is a rear perspective view of another aspect of a cover/identifier.

FIG. 24 illustrates a cover/identifier referred to by reference number 110A. Device 110A comprises a pair of devices 110 shown in FIGS. 21 and 22. It will be noted that cover/identifier 110A includes a single, wider top wall, e.g. top wall 112A with a pair of cut-outs 114A. Device 110A includes a rear wall 130 and a pair of loops 131. There also is an optional end wall 132.

Figure 23:
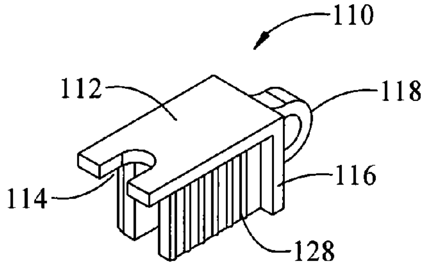
FIG. 23 is a front perspective view of another aspect of a cover/identifier.
Figure 25:
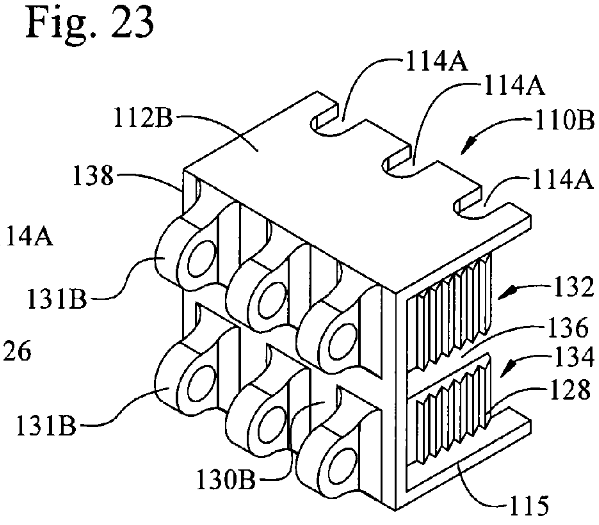
FIG. 25 is a rear perspective view of another aspect of a cover/identifier.

Similarly, FIG. 25 illustrates a cover/identifier referred to by reference number 110B, which comprises two opposed banks, 132, 134 of devices 110 shown in FIG. 23. The two banks define a transverse channel 136. Device 110B includes a substantially wider top wall 112E with multiple cut-outs 114A and a mirror image bottom wall 115. Device 110B includes a back wall 130B and loops 131B. Device 110B, as shown, also includes an optional end wall 138.

It will be understood that the cover/identifiers of FIGS. 24 and 25 are merely illustrative of broad aspects of devices that allow multiple cover/identifiers to be employed in pairs or banks or other multiple arrangements and do not represent the only such embodiments.

Figure 26:
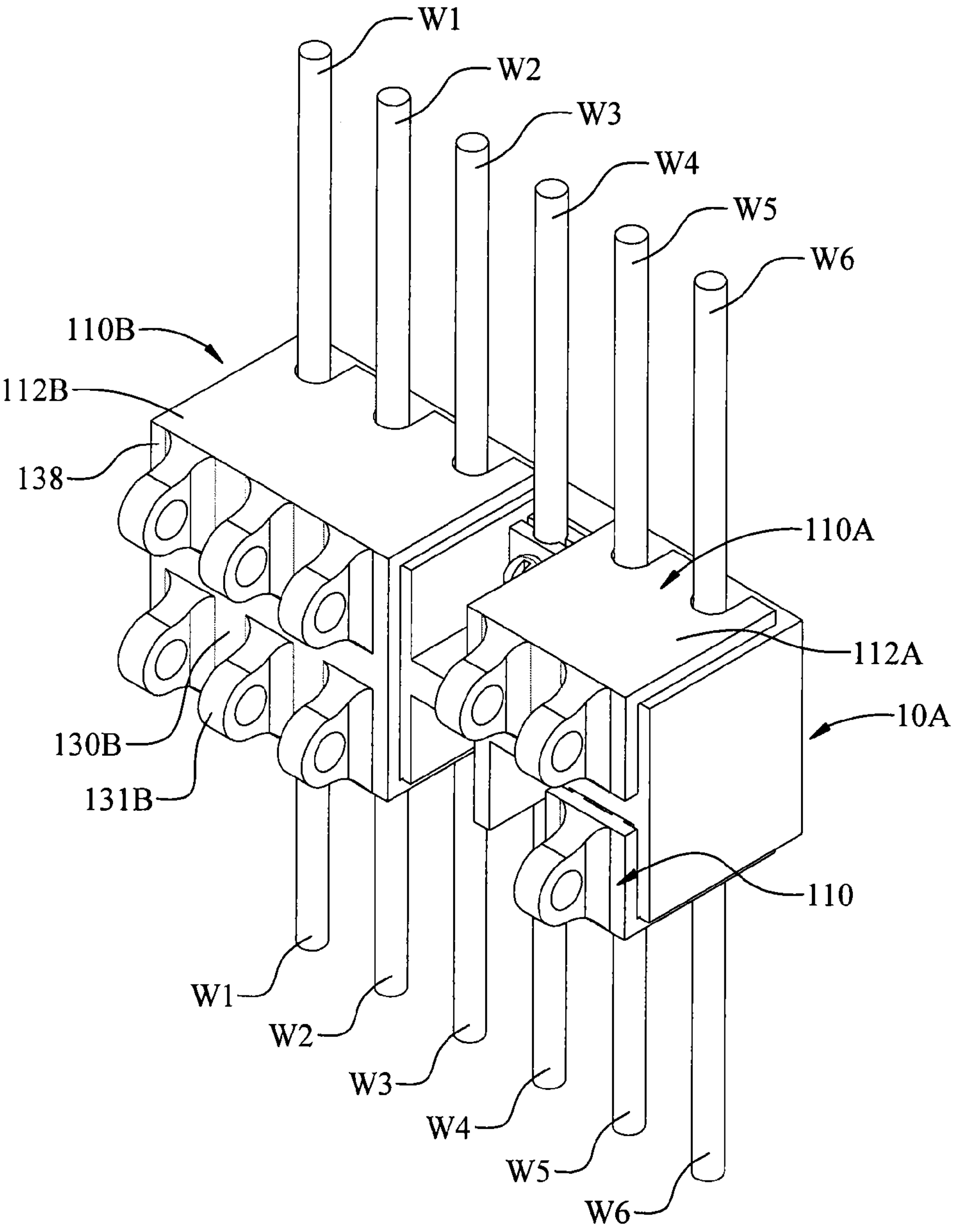
FIG. 26 is a perspective view of the cover/identifiers of FIGS. 21-25 attached to a terminal block.

FIG. 26 illustrates the above described cover/identifiers in use on a terminal block. For example, for cover identifier 110, 11 OA or 110B the user can grasp loop 118 and slide walls 120, 122 between adjacent divider walls 20A, Walls 120 and 122 are an appropriate distance apart to allow then to side between walls 20A. Flexible fins 126 or 128 exert a biasing force against walls 20A to maintain the device in place with a tight friction fit.

Furthermore, when device 110B is installed, transverse channel 136 between the two banks seats transverse divider 26 engages channel 136 to help secure it in place. Top wall 112 or 112A and rear wall 116 cover the wire terminals and wires W1-W4 seat in cutouts 114. If the devices are used at an end of a bank of terminal connections, or adjacent an open terminal connection, the respective end walls 130 and 136 complete the cover around the terminal connections.

Figure 27:
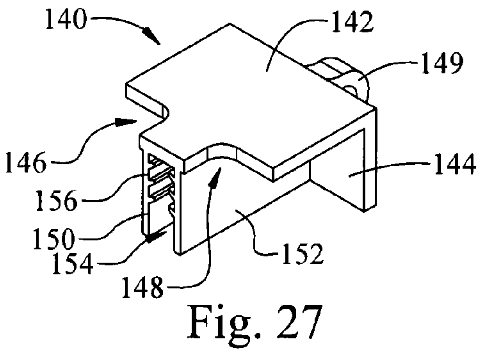
FIG. 27 is a front perspective view of another aspect of a cover/identifier.
Figure 28:
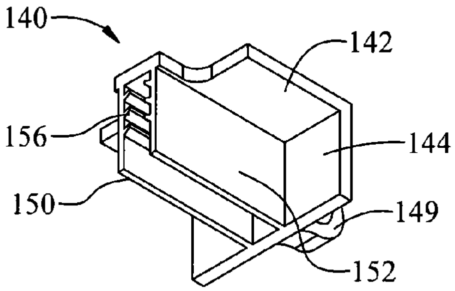
FIG. 28 is a front bottom perspective view thereof.
Figure 29:
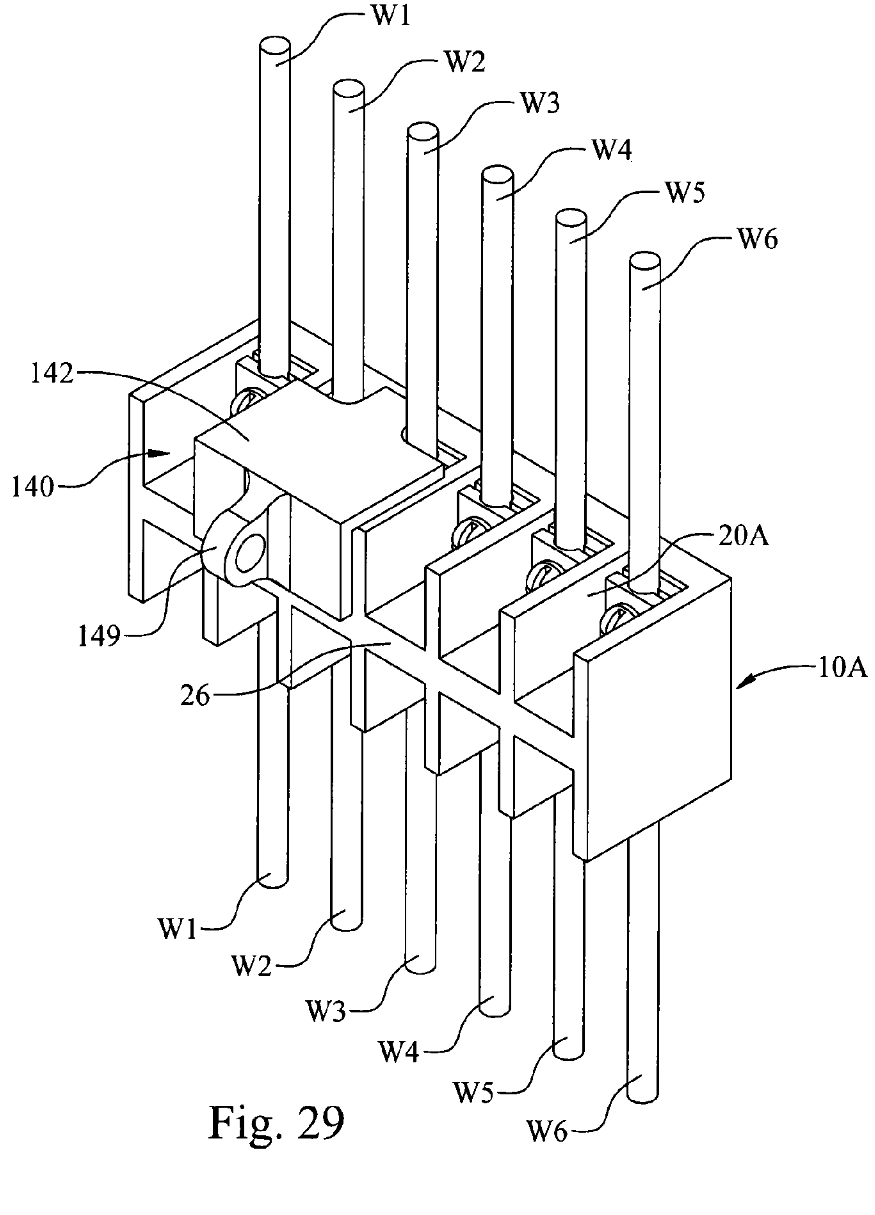
FIG. 29 is a perspective view of the cover/identifier of FIGS. 27 and 28 attached to a terminal block.

FIGS. 27-29 illustrate another aspect of a cover/identifier indicated generally be reference number 140. Device 140 includes a top wall 142 and a rear wall 144 in a generally L-shaped arrangement. Top wall 142 has a pair of corner cut-outs 146 and 148 on the proximal end of the wall. There is a loop 149 on the exterior of back wall 144. There are two spaced apart, depending, longitudinally extending walls 150 and 152 on each side of the midline of lop wall 142. Walls 150 and 152 have interior surfaces that define a channel 154. The width of channel 154 is only slightly oversized compared to the width of a terminal block wall 20A.

There is a plurality of resilient fins 156 on the interior surfaces of walls 150 and 152. In use, walls 150 and 152 are positioned on each side of a wall 20A such that wall 20A is engaged in channel 154. The device slides along wall 20A until cut-outs 146 and 148 abut wires W2 and W3, for example, thereby covering two adjacent wire terminals. Resilient fins 156 exert a biasing force on wall 20A to help secure the device with a snug friction fit. Top wall 142 and rear all 144, along with adjacent walls 20A surround and cover the terminal connections.

It will be understood that relative orientation terms such as "top", "bottom, "rear", "horizontal", "vertical", proximal and "distal", transverse and so forth are used herein for simplicity and clarity in reference to the drawing figures. The terms are not absolute and the orientation of the various elements in actual use will depend upon the orientation of the terminal block with which the cover/identifier is used.

It also will be appreciated that various changes and modifications may be made in the various aspects of the disclosed cover identifiers without departing from the scope of the appended claims. Therefore, the detailed disclosure and accompanying drawings should be considered illustrative of broader aspects of the device and should not be viewed as limiting in any sense.

The invention claimed is:

1. A device for covering a functional pair of wire terminals in an electric terminal block comprising:

a first leg having distal end and a proximal end configured to cover one of said functional pair of wire terminals;

a second leg having a distal end and a proximal end configured to cover the other of said function pair of wire terminals;

the proximal ends of said first and second legs having marginal surfaces defining opposed jaws; and a resilient spring structure connecting said first and second legs;

wherein the spring structure defines a stop gap to delimit opening of the jaws; and wherein said device comprises dielectric material.

2. The device of claim 1 wherein the proximal end of each leg has a substantially flat face.

3. The device of claim 1 further comprising a stop between the first and second legs to delimit opening of the jaws.

4. The device of claim 1 wherein the jaws have a serrated surface.

5. The device of claim 1 wherein the device is a predetermined color, said color corresponding to predetermined indicia.

6. The device of claim 1 further comprising an indicator element secured in an opening defined by the distal end of a leg.

7. The device of claim 1 wherein the resilient spring structure has a substantially C-shaped configuration.

8. The device of claim 1 wherein the device is a predetermined color, said color corresponding to predetermined indicia.

9. The device of claim 1 wherein each said leg defines an opening and further comprising apparatus for joining adjacent devices in said opening.

10. The device of claim 9 further wherein said apparatus for joining adjacent devices comprises a connector peg.

11. The device of claim 1 wherein the first leg has a first and second side and a first wing extending laterally from the first side and a second wing extending from the second side, and said second leg has a first side and a second side and a first wing extending laterally from said first side and a second wing extending from the second side.

12. The device of claim 11 further comprising least one stabilizer clip between the wings extending from said first and second legs.

13. A device for covering a functional pair of wire terminals in an electric terminal block comprising:

a first leg having distal end and a proximal end configured to cover one of said functional pair of wire terminals;

a second leg having a distal end and a proximal end configured to cover the other of said function pair of wire terminals; and the proximal ends of said first and second legs having marginal surfaces defining opposed jaws; and a resilient spring structure connecting said first and second legs, said spring structure defining a stop-gap to delimit opening of the jaws;

wherein the first leg has a first and second side and a first wing extending laterally from the first side and a second wing extending from the second side, and said second leg has a first side and a second side and a first wing extending laterally from said first side and a second wing extending from the second side; and wherein said device comprises dielectric material.

* * * * *